Oct. 12, 1965          L. H. GERHARDT          3,211,045
                    OPTICAL ALIGNMENT SYSTEM
Filed Feb. 29, 1960                         3 Sheets-Sheet 1

INVENTOR.
Leslie H. Gerhardt
BY
Paul J. Ethington
ATTORNEY

Oct. 12, 1965 L. H. GERHARDT 3,211,045
OPTICAL ALIGNMENT SYSTEM
Filed Feb. 29, 1960 3 Sheets-Sheet 2

INVENTOR.
Leslie H. Gerhardt
BY
Paul J. Ethington
ATTORNEY

Oct. 12, 1965  L. H. GERHARDT  3,211,045
OPTICAL ALIGNMENT SYSTEM
Filed Feb. 29, 1960  3 Sheets-Sheet 3

INVENTOR.
Leslie H. Gerhardt
BY
Paul J. Ethington
ATTORNEY

United States Patent Office 3,211,045
Patented Oct. 12, 1965

3,211,045
OPTICAL ALIGNMENT SYSTEM
Leslie H. Gerhardt, Wauwatosa, Wis., assignor to General Motors Corporation, Detroit, Mich., a corporation of Delaware
Filed Feb. 29, 1960, Ser. No. 11,868
6 Claims. (Cl. 88—1)

This invention relates to optical systems and more particularly to sighting devices for use in determining whether a predetermined alignment exists between objects.

In accordance with this invention, there is provided a reflex sighting device of very simple optical and mechanical construction. It includes a reticle projector and beam splitter in a predetermined position relative to the user's sighting eye. A combining glass with a flat reflective surface thereon is angularly positioned, relative to a reference line on the object to be aligned, in accordance with the desired alignment angle. When the user looks at the combining glass with his sighting eye he sees the image of the reticle and under certain conditions of illumination, the image of his sighting eye may be superposed thereon. The reflected rays from the reticle are perpendicular to the combining glass and hence they are effectively collimated without the need of a bulky collimating lens. When the reticle image is superposed upon the other object, by displacement of the objects relative to each other, the desired alignment is achieved. This system results in a minimum of parallax and the eye motion required is dependent primarily on the size and location of the combining glass.

A more complete understanding of the invention may be had from the detailed description which follows taken with the accompanying drawings in which.

Figure 1:
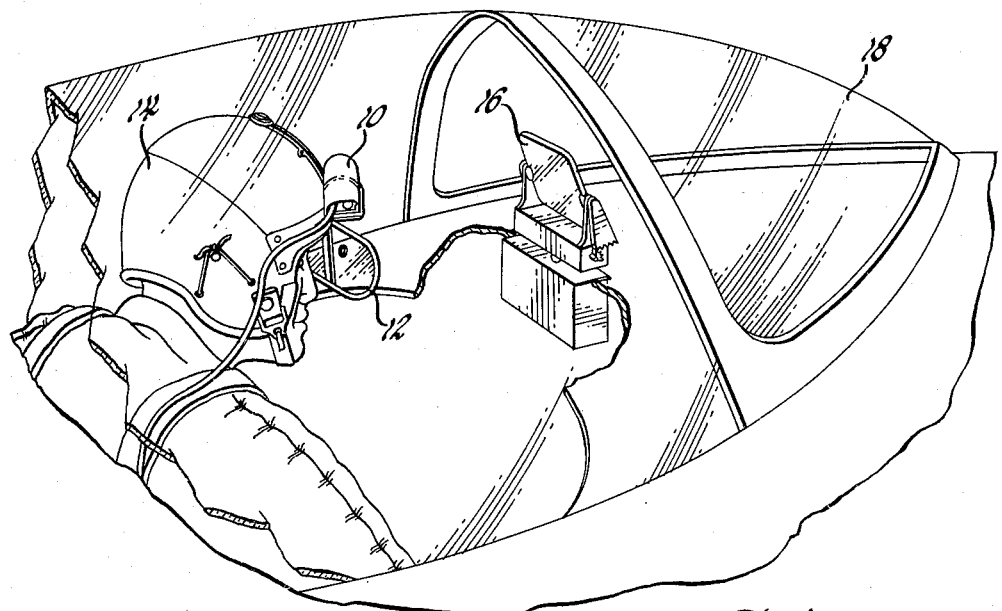
FIGURE 1 is a pictorial view of the invention embodied in a reflex sight of a fire control system of a military aircraft.

Referring now to FIGURES 1 through 4, there is shown an illustrative embodiment of the invention in a reflex sight for aiming the guns of an aircraft. The sight comprises, in general, a reticle projector 10 and goggles 12 mounted on the helmet 14. A combining glass 16 is mounted in the pilot's field of vision on the instrument panel structure behind the aircraft windshield 18.

The reticle projector 10 is adjustably mounted on the helmet and includes an electric lamp or light source 20. The light rays emanating from the source are transmitted through a condensing lens 22 to a reticle 24, suitably in the form of a ring and concentric dot, through which light rays are projected to a light polarizer such as a Polaroid plate 26. The polarized light rays are transmitted to a semi-transparent glass plate or beam splitter 28 in the right eyepiece of the goggles 12 which are detachably mounted on the helmet by a bracket 31. The left eyepiece of the goggles is a Polaroid plate 30 with polarization in a plane different from the plane of polarization of the plate 26. The reticle projector is adjustably positioned so that a line from the reticle to the pilot's eye is perpendicular to the beam splitter and is divided into two equal lengths thereby. Stated otherwise, the positional relationship is such that the beam splitter is a bisector of the angle between the lines drawn from the pilot's eye and the reticle to any common point on the beam splitter.

The combining glass 16 is a flat piece of glass suitably mounted on the instrument panel structure of the aircraft inside the windshield 18. The plane of the combining glass is perpendicular to the desired line of sight and when the system is utilized as a fixed sight, the plane of the combining glass is suitably perpendicular to the boresight or other reference axis of the aircraft. In a predicting sight system, the combining glass is mounted for angular displacement about an azimuth axis and an elevation axis. For this purpose, the combining glass 16 is provided with a pair of trunnions 32 and 32' which are rotatably supported in the yoke 34 for angular displacement about the elevation axis. The yoke is mounted on a vertical shaft 35 which extends into a servomotor housing 36 for angular displacement about an azimuth axis. To the outer ends of the trunnions are affixed a pair of gear sectors 38 and 38' which mesh with a pair of pinion gears 40 and 40', respectively, which in turn are driven by a shaft 42 connected with an elevation servomotor in the housing 36. The elevation and azimuth servomotors are energized in accordance with the prediction angles developed in an associated computing system to maintain the combining glass in an angular position, relative to the boresight axis of the aircraft, so that the correct lead angle is achieved when the plane of the combining glass is perpendicular to the line of sight to the target.

Figure 3:
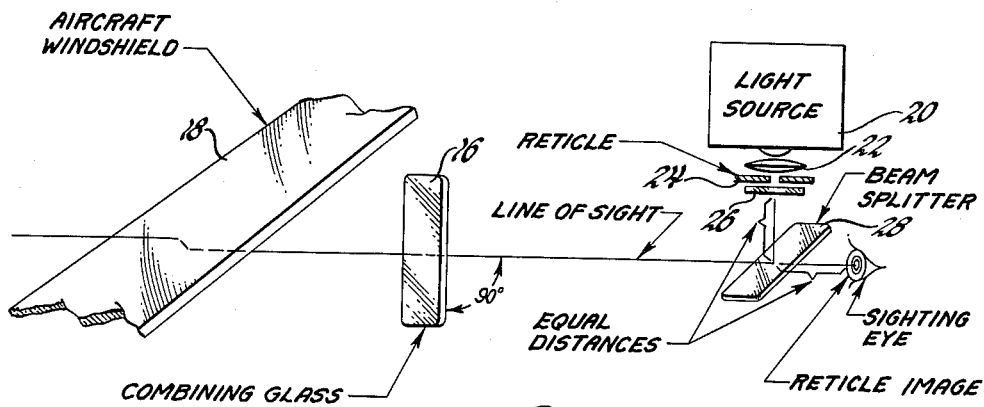
FIGURE 3 is a schematic diagram of the optical system of the reflex sight.
Figure 4:
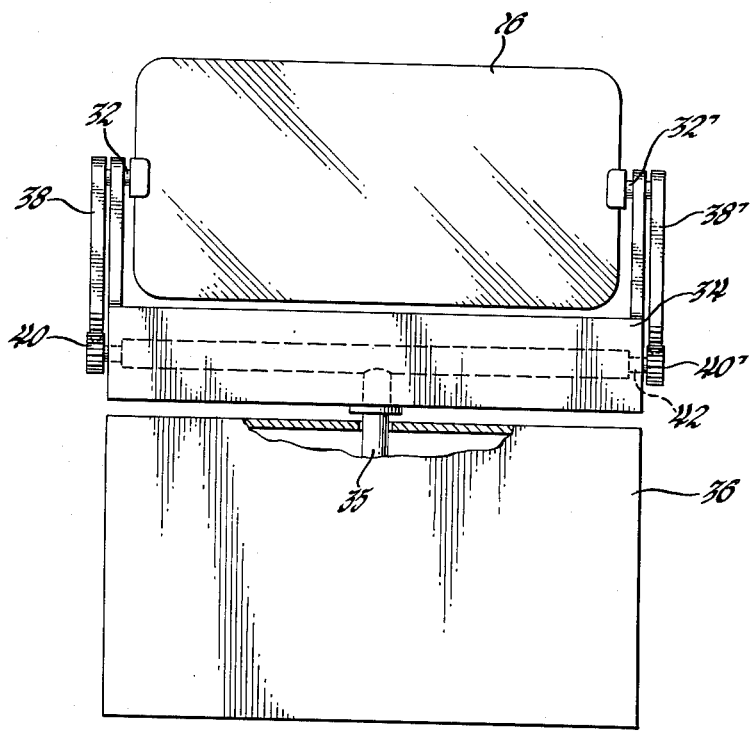
FIGURE 4 shows the mounting of the combining glass on a prediction servo.

Before discussing the alignment and use of the inventive reflex gun sight, the principles of the optical system will be considered. Referring to FIGURE 3, it will be seen that when the pilot looks through the beam splitter 28 with his sighting eye to the combining glass 16 he will see an image of his sighting eye only when his line of sight is perpendicular to the combining glass. When the reticle 24 is located the same distance from the intersection of the line of sight with the beam splitter, as is the pilot's sighting eye, with the beam splitter bisecting the angle therebetween, the image of the reticle will be reflected from the beam splitter to the combining glass and thence back through the beam splitter to the pilot's sighting eye. Consequently the pilot, looking into the combining glass, sees the image of his sighting eye and the image of the reticle superimposed thereon. Since all of the reflected rays from the sighting eye and from the reticle image which are seen by the pilot's eye are perpendicular to the combining glass, such reflected rays are all parallel to each other, or collimated, with the effect of coming from infinity. As a result, the angular relation between the pilot's line of sight, and the aircraft reference axis, is dependent only upon the angular position of the combining glass. Therefore, if the pilot looks through the combining glass and the aircraft windshield at a target, such as an enemy aircraft, and maneuvers his own aircraft so that the reticle image is superposed upon the target, then the boresight axis of the aircraft is angularly displaced from alignment with the target by the prediction angle of the combining glass. In other words, assuming the prediction angles to be correct, if the pilot fires his guns when the reticle image is superposed on the target he will score a hit.

If the pilot were to view the reflected reticle image with his other eye, instead of his sighting eye, there would be an angular error dependent upon eye spacing and distance to the combining glass. To eliminate this possibility, the polarized plate 26 causes the light rays of the reticle image to be polarized in one plane and the polarized plate 30 prevents light rays of this polarization from reaching the other eye of the pilot.

Figure 2:
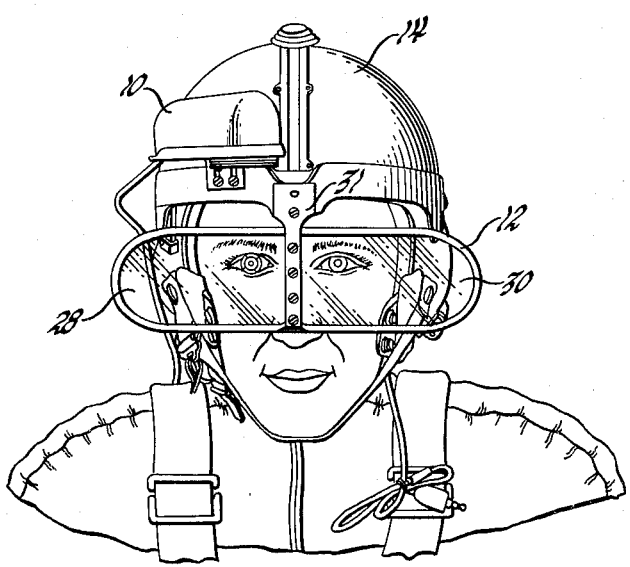
FIGURE 2 is a front elevation view of part of the reflex sight mounted on a pilot's helmet.
Figure 7:
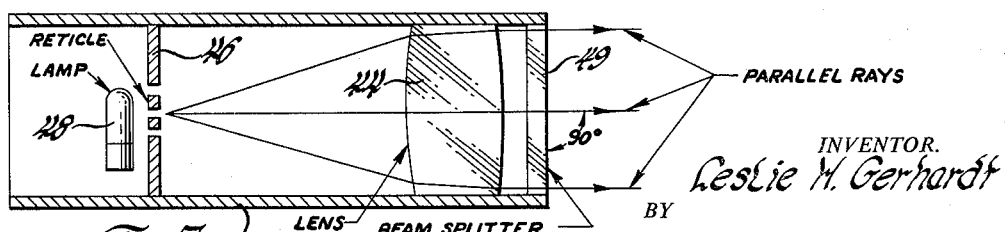
FIGURE 7 shows a collimator for use in adjusting the inventive sight.

In order to adjust the sighting device properly with reference to the pilot's eye, a simple collimator may be employed as shown in FIGURE 7. This collimator comprises a tubular body 43 which supports a collimating lens 44 and a reticle 46 defining a concentric ring and dot at the focal point of the lens. A lamp 48 is positioned adjacent the reticle and the light rays emanating therefrom pass through the lens and are collimated thereby so that they appear to emanate from a source at infinite distance. A beam splitter or semi-transparent mirror 49 is mounted in the body in front of the lens so that it is perpendicular to the collimated light rays. In using the collimator, the pilot dons the helmet as shown in FIGURE 2 and views the image of the sight reticle in the mirror of the collimator and simultaneously views the collimator reticle through the mirror. The reticle projector is then adjusted on the helmet until the sight reticle image is concentric with the collimator reticle image for all viewing positions so that the rays from the two reticle images are parallel. When the light rays are parallel, the sight reticle image rays are collimated. This indicates that the sight reticle image is in the pilot's eye and that the reticle projector is properly adjusted. In operation of the sight in the aircraft, the pilot will normally don the helmet without the goggles. Shortly before he is ready to fire his weapons, the goggles should be installed on the helmet and to ensure proper adjustment, a final check should be made with the collimator. The collimator is suitably mounted in any convenient viewing location within the cockpit and the pilot adjusts the entire helmet on his head so that he sees the sight reticle image and the collimator reticle image as concentric circles. The pilot can now view the target and the reticle and still have freedom of head motion due to the collimation of the reticle image. Thus when a target is sighted, the pilot maneuvers the aircraft so that the reticle image is superposed upon the target and fires his guns. In addition to the freedom of head motion, the reflex sight affords the advantage of requiring a minimum of eye motion. The eye movement required is dependent only on the size and location of the combining glass and on the amount of prediction required. The parallax error is dependent only upon the flatness of the combining glass, assuming the sight reticle image to be located properly at the pilot's eye, and thus it may be reduced to a negligible value.

Figure 5:
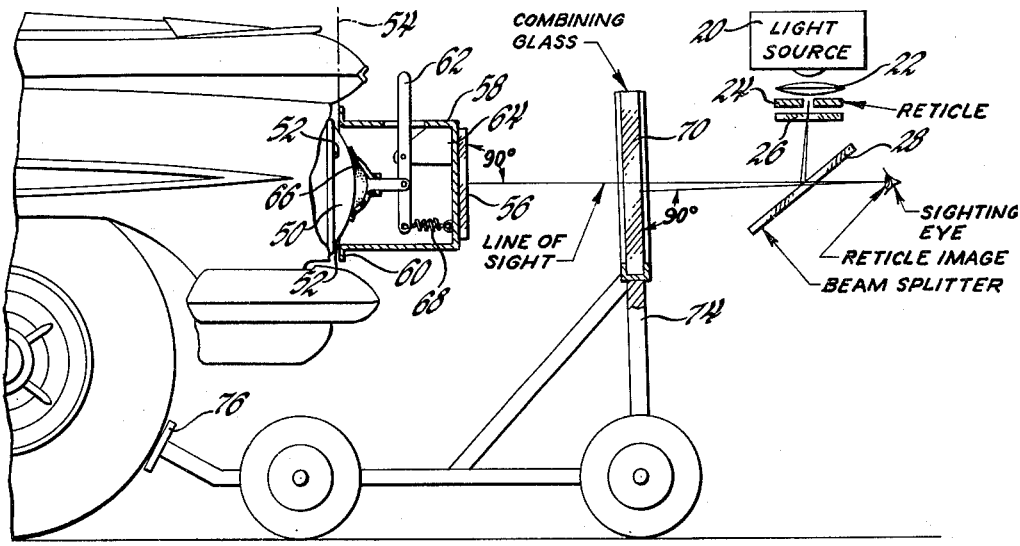
FIGURE 5 shows the invention embodied in an apparatus for aiming the headlamps of a vehicle.
Figure 6:
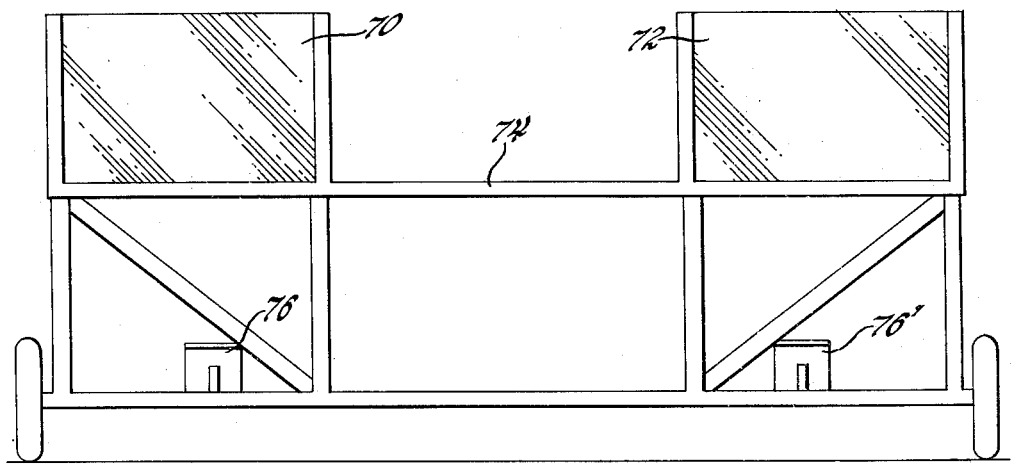
FIGURE 6 is a view of the combining glasses mounted upon a movable dolly.

In a somewhat different embodiment, the inventive sighting device is especially well adapted for use in aiming the headlamps of automotive vehicles as shown in FIGURES 5 and 6. In the illustrative embodiment, a vehicle is provided with the so-called pre-aimed headlamps in a headlighting system of four headlamps. For illustrative purposes only, the right outboard headlamp 50 is shown. The pre-aimed headlamp includes a set of at least three aiming bosses or protuberances 52 which are located at the periphery of the lens and which are adjusted in height at the lamp factory so that the outer ends thereof define an aiming plane 54 which is perpendicular to the direction of the light beam emanating from the lamp. The lamp is mounted on the vehicle in a conventional adjustable mounting of the ball and socket type which permits aiming of the headlamp in the vertical and horizontal planes by a pair of adjustment screws.

The sighting device in this embodiment comprises a flat mirror 56 mounted upon the closed end of a cylindrical housing 58 which terminates in an annular flange 60. The flange 60 is adapted to seat against the aiming bosses 52 of the lamp so that the mirror is parallel with the aiming plane of the lamp. In order to secure the housing 58 to the lamp, there is provided an operating lever 62 which is pivotally mounted upon the housing 58 by a bracket 64 and which carries a suction cup 66 on a pivoted arm. The lower end of the lever 62 is biased in a counterclockwise direction by a tension spring 68. By this arrangement, the mirror 56 may be secured to the headlamp 50 by seating the flange 60 against the aiming bosses 52 and rotating the lever 62 in a clockwise direction so that the suction cup 66 is pressed against the lens of the lamp. When the operating lever 62 is released, the spring 68 tends to rotate the lever in a counterclockwise direction and thrusts the housing 58 toward the lamp to seat the flange 60 on the aiming bosses. Thus, the mirror 56 is secured to the lamp 50 in a position parallel to the aiming plane and hence perpendicular to the direction of the light beam projected from the lamp. It will be apparent that a reflective surface can be provided on the lamp itself to define the desired aiming plane, in lieu of the arrangement just described.

A pair of combining glasses 70 and 72 are mounted upon a dolly 74 in a position so that the flat surfaces thereof are perpendicular to the floor supporting the dolly. The dolly is positioned in front of the vehicle so that the combining glass surfaces are perpendicular also to the longitudinal axis of the vehicle. This is accomplished in any suitable manner, for example, by means of a pair of pads 76 and 76' on opposite sides of the dolly and adapted for engagement with the front tires of the vehicle. Thus when the front wheels of the vehicle are in the straight-ahead position, the combining glasses 70 and 72 will be perpendicular to the longitudinal axis of the vehicle.

The sighting device includes the reticle projector, as previously described in connection with the reflex gun sight and it may be mounted upon an operator's helmet or upon a pair of specially constructed spectacles.

In operation of the sighting device for aiming of headlamps, the reticle projector is adjusted so that the image of the reticle is positioned in the operator's eye when the operator's line of sight is perpendicular to the combining glass. With the mirror 56 mounted on the headlamp 50 and with the dolly 74 properly located, the operator then looks at the combining glass 70 to see the reflected image of the reticle and also looks at the mirror 56 to see the image of the reticle reflected therefrom. If these two reflected images of the reticle are not superimposed, the mirror 56 is not parallel with the combining glass 70, since the line of sight must be perpendicular to the combining glass and to the mirror in order to see the respective reflected images superimposed. Accordingly, the operator will adjust the headlamp in the vertical and horizontal planes until the reticle images become superposed so that the mirror 56, and hence the aiming plane of the lamp 50, will be parallel to the combining glass 70. When this relationship is obtained the headlamp is aimed with its light beam direction parallel to the longitudinal axis of the vehicle.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. An optical system for determining whether first and second objects are in a predetermined alignment; the first object having a reference axis which is to be aimed at a predetermined angle from the line of sight between the first and second objects, support means being movable independently of said objects and engageable with a person's head, a beam splitter mounted upon the support means in front of the person's sighting eye, a reticle and a light source mounted upon the support means so that an image of the recticle impinges upon the beam splitter and is reflected forwardly thereby, the reticle and the beam splitter being positioned relative to the sighting eye so that any point on the beam splitter is equidistant from the reticle and the sighting eye, a transparent combining glass mounted upon the first object and having a flat reflective surface disposed so that a line normal thereto extends at said predetermined angle with respect to the reference axis, said combining glass being disposed in the person's line of sight for reflecting an effectively collimated image of the reticle into the person's sighting eye when the line of sight is perpendicular to the surface of the combining glass whereby the reflected image of the reticle intercepts the sighting eye and the line of sight through said combining glass simultaneously intercepts the second object when the first and second objects are in the predetermined alignment.

2. An optical system for determining whether first and second objects are in a predetermined alignment; the first object having a reference axis which is to be aimed at a predetermined angle from the line of sight between the first and second objects, support means being movable independently of said objects and engageable with a person's head, a beam splitter mounted upon the support means in front of the person's sighting eye, a light source mounted upon the support means, a reticle and a light polarizer with one plane of polarization interposed between the light source and the beam splitter so that an image of the reticle impinges upon the beam splitter and is reflected forwardly thereby, the reticle and the beam splitter being positioned relative to the sighting eye so that any point on the beam splitter is equidistant from the reticle and the sighting eye, a transparent combining glass mounted upon the first object and having a flat reflective surface disposed so that a line normal thereto extends at said predetermined angle wtih respect to the reference axis, said combining glass being disposed in the person's line of sight for reflecting an effectively collimated image of the reticle into the person's sighting eye when the line of sight is perpendicular to the surface of the combining glass whereby the reflected image of the reticle intercepts the sighting eye and the line of sight simultaneously intercepts the second object when the first and second objects are in the predetermined alignment, and a light polarizer with another plane of polarization mounted upon the support means in front of the person's other eye to prevent the image of the reticle from being viewed with said other eye.

3. A helmet mounted reflex sight for use on aircraft comprising; a helmet adapted to be worn by the pilot, a beam splitter mounted upon the helmet so as to be positioned in front of the pilot's sighting eye, a reticle and a light source mounted upon the helmet so that an image of the reticle impinges upon the beam splitter and is reflected forwardly thereby, the reticle and the beam splitter being positioned on the helmet so that any point on the beam splitter will be equidistant from the reticle and the sighting eye when the helmet is worn by the pilot, and a combining glass adapted for mounting upon the aircraft instrument panel structure in the pilot's line of sight and in a known angular position relative to the aircraft boresight axis for indicating a predetermined alignment of the boresight axis with a selected target when the image of the reticle reflected from the combining glass into the pilot's sighting eye is superposed upon the target.

4. A helmet mounted reflex sight for use on aircraft comprising; a helmet adapted to be worn by the pilot, goggles removably mounted upon the helmet and having a pair of eyepieces, one eyepiece including a beam splitter, a reticle projector adjustably mounted upon the helmet, and including a light source, the projector also including a reticle and a light polarizer interposed between the light source and the beam splitter so that an image of the reticle impinges upon the beam splitter and is reflected forwardly thereby, the reticle projector and the beam splitter being positioned relative to each other so that any point on the beam splitter will be equidistant from the reticle and the pilot's sighting eye when the helmet is worn by the pilot, a combining glass adapted for mounting upon the aircraft instrument panel structure in the pilot's line of sight and in a known angular position relative to the aircraft boresight axis, said combining glass reflecting an effectively collimated image of the reticle into the pilot's sighting eye when the line of sight is perpendicular to the combining glass thereby indicating a predetermined alignment of the boresight axis with a selected target when the image of the reticle reflected from the combining glass into the pilot's sighting eye is superposed upon the target, the other eyepiece including a light polarizer with a plane of polarization transverse of that in the aforementioned polarizer whereby the image of the reticle is prevented from reaching the pilot's other eye.

5. A sighting device for use in aiming vehicle headlamps; a headlamp, a reflective surface on the headlamp defining an aiming plane therefor in a known angular relation with the direction of the light beam produced by the lamp, a combining glass with a flat surface perpendicular to the desired direction of the light beam, support means adapted to be worn on a person's head, a beam splitter mounted on the support means so as to be positioned between the person's sighting eye and said combining glass when the support means is worn on the person's head, a reticle and a light source mounted so that an image of the reticle impinges upon the beam splitter and is reflected toward said reflecting surface through the combining glass, the reticle and the beam splitter being positioned so that any point on the beam splitter will be equidistant from the recticle and the person's sighting eye when the support means is worn on the person's head, said reflective surface and said combining glass being parallel when the image of the reticle reflected from the combining glass is superimposed upon the image of the reticle reflected from the reflective surface.

6. A sighting device for use in aiming vehicle headlamps, a vehicle including an adjustably mounted headlamp, a reflective surface on the headlamp defining an aiming plane therefor in a known angular relation with the longitudinal axis of the vehicle, support means adapted to be worn on a person's head, a beam splitter mounted upon the support means so as to be positioned in front of the person's sighting eye when the support means is worn on the person's head, a reticle and a light source mounted upon the support means so that an image of the reticle impinges upon the beam splitter and is reflected forwardly thereby, the reticle and the beam splitter being positioned so that any point on the beam splitter is equidistant from the reticle and the sighting eye when the support means is worn on the person's head, said reflective surface and said combining glass being parallel when the image of the reticle reflected from the combining glass is superimposed in the person's sighting eye upon the image of the reticle reflected from the reflective surface.

References Cited by the Examiner

UNITED STATES PATENTS

| | | | |
|---|---|---|---|
| 2,352,644 | 7/44 | Linderman et al. | 88—1 |
| 2,406,807 | 9/46 | Colbath | 88—1 |
| 2,431,942 | 12/47 | Land | 88—16.6 |
| 2,462,468 | 2/49 | Clark et al. | 88—1 |
| 2,464,195 | 3/49 | Burley et al. | 88—1 |
| 2,478,609 | 8/49 | Townsley | 88—1 |
| 2,870,671 | 1/59 | Falconi | 88—14 |
| 2,872,840 | 2/59 | Stanton | 88—72 |
| 3,031,919 | 5/62 | Collyer | 88—1 |

JEWELL H. PEDERSEN, *Primary Examiner.*

WILLIAM MISIEK, EMIL G. ANDERSON, *Examiners.*